United States Patent [19]

Ferguson

[11] 4,381,553
[45] Apr. 26, 1983

[54] PROGRAMMABLE PRINTER CONTROLLER WITH MULTILINE BUFFERING AND OVERSTRIKE FEATURE

[75] Inventor: Donald C. Ferguson, Los Gatos, Calif.

[73] Assignee: Mohawk Data Science Corp., Parsippany, N.J.

[21] Appl. No.: 227,281

[22] Filed: Jan. 22, 1981

[51] Int. Cl.³ .................. G06F 3/12; G06F 9/00; G06F 15/20
[52] U.S. Cl. .................... 364/900; 364/519; 400/62; 400/76
[58] Field of Search ... 364/200 MS File, 900 MS File, 364/519, 523; 101/93.04, 93.05, 93.08; 400/61, 62, 70, 76

[56] References Cited

U.S. PATENT DOCUMENTS

| | | | |
|---|---|---|---|
| 3,959,776 | 5/1976 | Morley | 340/172.5 |
| 3,970,183 | 7/1976 | Robinson et al. | 364/900 |
| 4,000,486 | 12/1976 | Schomburg | 364/200 |
| 4,005,390 | 1/1977 | Findley | 340/172.5 |
| 4,013,876 | 3/1977 | Anstin | 235/151 |
| 4,028,669 | 6/1977 | Higashide | 340/172.5 |
| 4,031,519 | 6/1977 | Findley | 364/900 |
| 4,048,625 | 9/1977 | Harris, Jr. et al. | 364/900 |
| 4,057,849 | 11/1977 | Ying et al. | 364/200 |
| 4,064,557 | 12/1977 | Bluethman et al. | 364/900 |
| 4,071,909 | 1/1978 | Geller | 364/900 |
| 4,086,660 | 4/1978 | McBride | 364/900 |
| 4,095,277 | 6/1978 | Bluethman et al. | 364/900 |
| 4,122,520 | 10/1978 | Adamchick et al. | 364/200 |
| 4,174,536 | 11/1979 | Misunas et al. | 364/200 |
| 4,179,732 | 12/1979 | Khan et al. | 364/200 |
| 4,261,039 | 4/1981 | Baker et al. | 364/519 |
| 4,279,199 | 7/1981 | Blanco et al. | 364/900 |
| 4,282,583 | 8/1981 | Khan et al. | 364/900 |
| 4,290,116 | 9/1981 | Morse | 364/900 |
| 4,300,206 | 11/1981 | Belleson et al. | 364/900 |
| 4,342,096 | 7/1982 | McDevitt | 364/900 |
| 4,353,298 | 10/1982 | Baker et al. | 101/93.05 |

*Primary Examiner*—James D. Thomas
*Assistant Examiner*—Archie E. Williams, Jr.
*Attorney, Agent, or Firm*—Robert R. Hubbard

[57] ABSTRACT

This controller may be used to direct operations of a remote station impact line printer whose data source is a host computer. The controller includes a microprocessor (CPU), a memory large enough to accomodate a plurality of lines of textual data, and host computer and printer interfaces arranged in a firmware implementation. A multiline buffering feature includes capability for receipt of incomplete lines and printing of partial lines. An overstrike feature includes capability for printing more than one character at the same print point (e.g., underlining, or "0") without intervening horizontal escapement commands such as backspace or carriage return.

5 Claims, 6 Drawing Figures

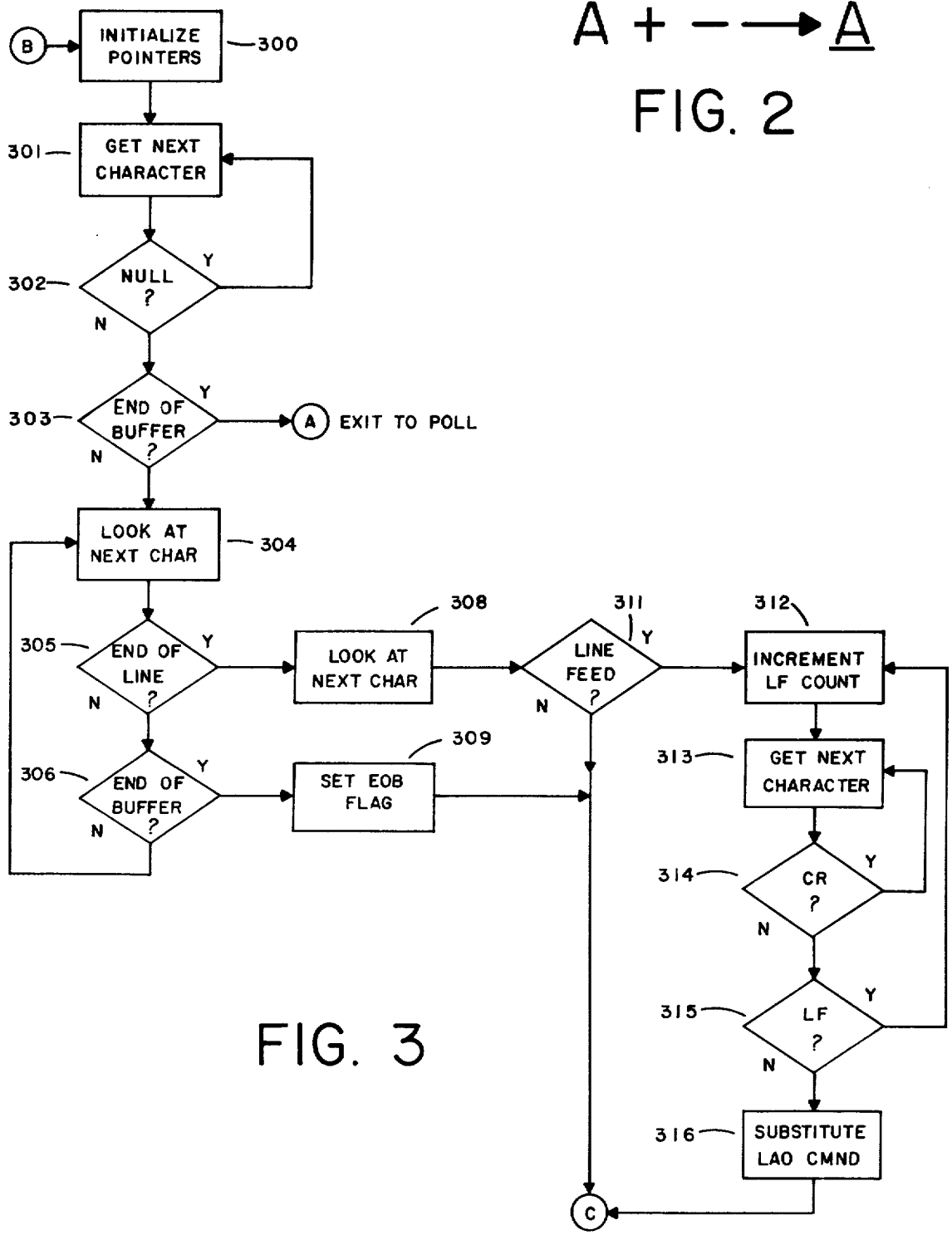

PROGRAMMABLE PRINTER CONTROLLER WITH MULTILINE BUFFERING AND OVERSTRIKE FEATURE

FIELD OF INVENTION

This invention relates generally to data processing systems and in particular to a novel and improved programmable printer controller for a printer mechanism.

Printer mechanisms and their associated printer controllers are useful in data processing systems to provide information in hard copy form. Generally the printer mechanism operates very slowly compared to the rate at which the information (data or characters) can be supplied by the computer or processor or other data source in the system. The printer controller acts to perform various status communication operations with the computer, to buffer the data, to format the data in accordance with command information provided by the computer and to control the printing of the data by the printer.

BACKGROUND OF INVENTION

For many years printer controllers were designed with dedicated logic or control circuitry. When it later became desirable to add new functions to the controller, a major redesign effort was required. In recent years, programmability has been designed into printer controllers primarily due to the advent of low cost microprocessors. This has resulted in the benefit of adding or changing functions by merely changing the program which directs the operation of the controller. Generally, the procedure for a hard copy printout in a data processing system begins when the system computer sends a sequence of commands to the printer controller. One of these commands is a status request to which the controller responds with a status report. If the report is good, the computer sends a command signalling the transfer of data to be printed together with such data. The printer controller acts to load the data into a buffer memory and then enters a print mode during which the data and various print commands are issued to the printer mechanism to print the data.

In prior art printers the controller architecture has limited the receipt of data to a single line of characters at a time. In some printers, exemplified by those described in U.S. Pat. Nos. 3,959,776 and 4,179,732, the line of characters is then processed and printed without further delay. Upon completion of the printing operation, the controller signals the computer and another line of data is sent, processed and printed and so on. In other prior art printers, exemplified by U.S. Pat. Nos. 4,005,390 and 4,031,519, the line of characters is processed into a textual and formatted line image and stored in a page buffer memory. The next line of data is then received and similarly processed and stored in the page buffer. This procedure continues until the page buffer contains a complete textual and format image of the page to be printed. The controller then enters a printing mode in which the page buffer is addressed line by line to control the printing mechanism. These prior art printers which can accept only a line of text at a time and then must request another line place a severe demand on valuable computer time, particularly, if the text to be printed comprises tabular formats with short textual lines.

In prior art printers such as those mentioned above, overstrike print operations have been possible. In an overstrike print operation two or more print operations per character position are needed to form a resultant character image. These prior art printers have achieved the overstrike operation by following a textual character or characters to be overstriken with a backspace or carriage return character. For example, to achieve underlining of a single word requires the same number of backspace characters as there are characters in the word. This severely limits the number of textual characters per line as the controller and computer designs are set to operate on a limited number of characters per line.

SUMMARY OF THE INVENTION

The present invention is embodied in a printer controller having a memory, a processing unit and a printer interface interconnected with one another. An input means including the processing unit is arranged to receive a block of characters and to load or store such characters in the memory.

In one embodiment of the invention, the memory size is large enough to accommodate a plurality of lines of textual data (for one design, a buffer capacity of 144 characters is employed). Each line or sequence of textual characters in the block is delimited by an end of line (EOL) character. If the last line is an incomplete line of print; the EOL delimiter is omitted. An end of buffer (EOB) character may also be used to signify the end of the character block. A control means includes a program, also stored in the memory, for operating the processing unit in a processing loop which includes a line examination mode followed by a print line mode until all of the character sequences in the block have been processed. During each line examination mode the processing unit acts to examine each character in the line being examined and upon detection of either an EOL or an EOB character to exit to the print line mode. During each print line mode the processing unit acts to provide a set of control signals, textual characters of the line just examined and an associated set of print commands to the printer interface.

An output means including the printer interface responds to the control signals to provide the printer with the textual character sequences contained in the block and any associated print commands successively to effect the printing of a corresponding number of print lines and in the event the last such character sequence has no EOL delimiter, to effect the printing of a portion of a line for such sequence. This architecture allows the computer to transmit a group of textual lines of data all at the same time, thus eliminating the need for status and command communication sequences on a line by line basis. In addition, the architecture, in allowing the last character sequence in the block to be an incomplete line with no EOL delimiter, permits a textual line to subtend from one data block or buffer to another.

In another embodiment of the invention, each character includes a field of bit positions defining character intelligence and an additional bit position which if negated (reset), signifies a normal character and if asserted (set), signifies an overstrike character. A control means including a program stored in the memory operates the processing unit in a print line mode to provide a set of control signals, the textual characters of the sequence and a set of associated print commands to the printer interface. The print mode has an operating loop in which the processing unit generates for each textual character a print command specifying a carriage escapement of zero for an overstrike character and of one unit for a normal textual character.

Output means including the printer interface responds to the set of control signals to provide to the printer the textual characters and the associated set of print commands such that the printer prints in the same character position on a print media an overstrike textual character and the immediately following textual character. Thus, overstrike operations are achieved without the use of either backspace or carriage return characters, thus allowing a more complete use of the buffer storage for textual information.

BRIEF DESCRIPTION OF THE DRAWING

The above and other features and advantages of the present invention will become more apparent from the following description taken in conjunction with the accompanying drawing, in which:

FIG. 2 is a graphic illustration of exemplary overstrike operations which can be achieved in an improved manner by the controller of this invention; and FIGS. 3, 4, 5 and 6 are flow diagrams of the program routines which operate the processing unit and other means of the controller to achieve the multiline buffering and overstrike feature of this invention.

DESCRIPTION OF PREFERRED EMBODIMENT

Although the multiline buffering and overstrike features of this invention can be employed in a variety of printer applications, by way of example and completeness of description, these inventive features will be described herein in a remote station printer for a host data processing system. It is assumed that the system includes a host computer which transmits command data and data to be printed over a communication channel 10 (see FIG. 1) to the remote station printer. Also, the printer 21 is assumed to be a line printer of the 1300 family of printers available from Diablo Systems, Inc., a subsidiary of Xerox Corporation.

Figure 1:
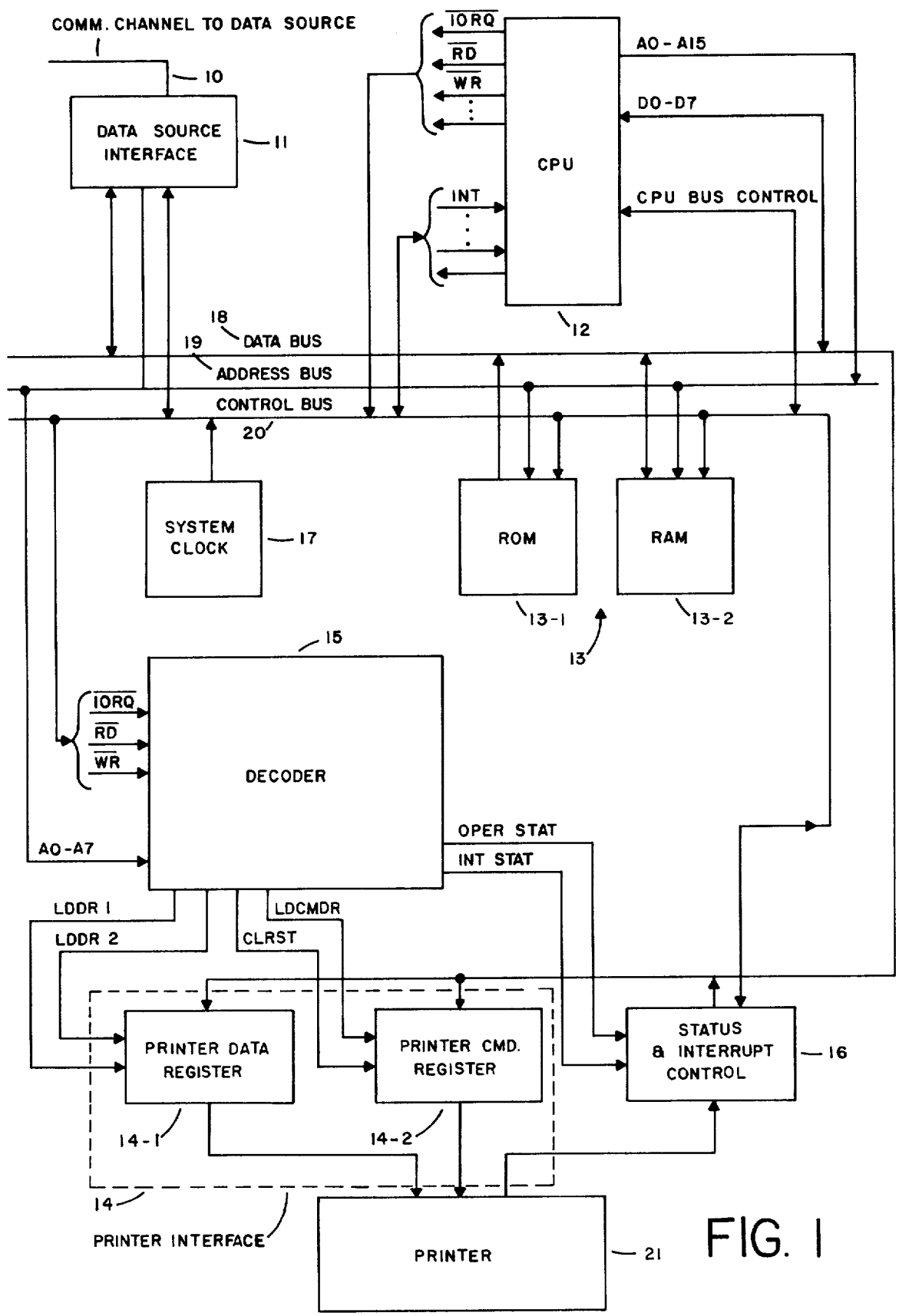
FIG. 1 is a block diagram of the system architecture of a programmable printer controller embodying the present invention.

Referring now to FIG. 1, the heart of the controller is a processing unit or CPU 12 which under the control of a program stored in a memory means 13 directs the interpretation and printing of data characters received over the communication channel 10. This control is exercised over an internal bus consisting of a data bus 18, an address bus 19 and a control bus 20. A data source interface 11 is interposed between the communication channel 10 and the internal bus. A printer interface 14 is arranged to control the transfer of data characters and command characters to the printer and to route printer status and interrupt information to a status and interrupt control 16. The status and interrupt control contains an interrupt register and a printer status register, neither of which are illustrated but both of which are referred to later.

The memory means 13 is shown in the illustrated embodiment to include a read only memory (ROM) 13-1 and a random access memory (RAM) 13-2. For this design, the program generally resides in the non-volatile ROM 13-1 and the data to be printed is stored in a portion of the RAM 13-2. However, the system could just as well employ a single RAM which contains both the program and the data to be printed.

The CPU 12 in the exemplary design takes the form of a Z-80 microcomputer which is described in some detail in the manual, Microcomputer Z-80 Data Book of Mostek Corporation, 1978. The CPU 12 is arranged to communicate with the memory 13 so as to execute the program in the ROM and to control the reading and writing of data from and to the RAM. To this end, the CPU has address leads carrying bits or signals Ao-A15 to the address bus 19, data leads carrying the data bits or signals Do-D7 to the data bus 18 and a number of control leads, two of which carry a memory read $\overline{RD}$ signal and write $\overline{WR}$ signal to the control bus.

The CPU control leads also carry an interrupt (INT) signal and a number of I/O control signals. The INT signal is an input from the status and interrupt control 16 while the I/O control leads include the $\overline{IORQ}$ signal and various other signals labeled CPU bus control. The $\overline{IORQ}$ signal together with the $\overline{RD}$ and $\overline{WR}$ signals can be employed to control the reading and writing of the RAM for the benefit of an I/O unit such as the printer interface or the interrupt control. The CPU bus control signals allow an I/O unit to gain control of the internal bus as, for example, to perform a direct memory access (DMA) operation. System clock 17 is arranged to provide clock signals to the control bus 20. These clock signals are used by the CPU so as to perform its various operations in a synchronous manner. All of the foregoing CPU, memory and I/O connections and operations are described in some detail in the aforementioned Z-80 manual.

Data source interface 11 is arranged to receive a block of characters for printing over the communication channel 10 and to transfer the block of characters to the RAM 13-2 via the internal bus for buffer storage. This can be accomplished in accordance with any known technique. For example, the data source interface upon receiving a command from the host computer signifying the impending arrival of a block of characters, signals the CPU 12 via the CPU bus control leads for a bus request. CPU 12 responds with a bus acknowledge and enters a wait state. The data source interface then performs a DMA (direct memory access) operation to store the characters in the RAM as they arrive from the host computer. When the last of these characters (144 for the illustrated design) has been stored, the data source interface signals the status and interrupt control 16 via the control bus 20 to set a buffer ready flag (flipflop) contained in its interrupt register. This, in turn, causes an INT signal to the CPU 12. The CPU responds to the INT signal by branching to a program routine in which it examines the interrupt register and then upon discovery that the interrupt is a buffer ready condition to branch to the program routines described in more detail in conjunction with FIGS. 3 to 6.

In accordance with the present invention the block of characters may include one or more textual lines of characters and a line of characters may actually extend from one block to the next. Each complete line or sequence of characters is delimited by an end of line (EOL) character. If the last character sequence in the block is an incomplete line, the EOL delimiter is omitted. In any case an EOB character may be used to signify the end of the character block. Various attribute characters signifying such things as carriage return, backspace, tab and the like may be embedded in the character sequences for formatting purposes.

Further in accordance with the principles of this invention, each character includes a field of bit positions which are indicative of the character intelligence and a further bit position (tag bit) which if set (a "1") signifies an overstrike character operation and if reset (a "0") signifies a normal character. As character data is generally transferred in present day data processing systems in bit groupings of four or eight, this feature is readily achieved in a design utilizing eight bits and the well known ASCII code (7 bits).

The printer interface 14 includes a printer data register 14-1 and a printer command register 14-2. The data in register 14-1 is a function of the command in register 14-2. For example, if the command is a print command, the data is a textual character. On the other hand, if the command is a paper feed command, the data represents the distance the paper is to be moved.

The registers 14-1 and 14-2 are loaded with print data and commands by a control means which includes the CPU 12, a program stored in the ROM and a decoder network 15. The control means is essentially a firmware implementation in which bit patterns contained in the program are used to control the loading of print data and commands into registers 14-1 and 14-2 as well as the sampling of registers contained in the status and interrupt control 16. To this end, the address bit signals Ao-A7 are used by the CPU 12 to signify the firmware bit patterns and as such are coupled to the decoder 15 via the address bus 19. Also coupled to the decoder 15 are the I/O memory read and write signals $\overline{IORQ}$, $\overline{RD}$, and $\overline{WR}$. The decoder includes circuits which perform simple "and", "or" or "inversion" functions in combining the I/O signal with the firmware bit patterns to produce a number of signals designated in FIG. 1 as LDDR1 (load data register 1), LDDR2 (load data register 2), LDCMDR (load command register), CLRSTR (clear strobe), INT STAT (interrupt status) and OPER STAT (operating status). The two load signals LDDR1 and LDDR2, are employed in this design because the data is transferred from the RAM 13-2 in four bit slices. The LDDR1 signal loads the first four bit slice and the LDDR2 signal loads the second four bit slice at a later time. The LDCMDR signal serves to load the print command into the printer command register 14-2. The CLRST signal serves to terminate the command. This signal is generated by a delay circuit (not shown) in response to the leading edge of the LCMDR signal, the delay determining the sample window during which the printer 21 must strobe the data lines. The printer command in this design consists simply of a byte which includes bits assigned to such printer functions as character strobe, carriage strobe, paper feed strobe and restore. For example, if the character strobe bit is set, the printer 21 interprets this as a print command and acts to strobe the data into its internal print character register.

As the printer 21 completes its performance of each command, it provides to the interrupt register a ready signal which sets an interrupt flag corresponding to the operation just performed. For example, if the operation just performed is a carriage strobe or move command, a carriage ready flag is set. This causes the status interrupt control 16 to provide an INT signal to the CPU 12. The CPU 12 responds to the interrupt to examine the interrupt register. Upon discovery that the interrupt is a carriage ready condition from the printer 21, it continues to execute the program routine for the print mode.

The printer also provides some other status information to the status and interrupt control 16 which is placed in the printer status register. This information includes such things as cover open, printer offline, out of paper, end of ribbon and the like. The setting of any of these status conditions also causes an error flag to be set in the interrupt register which in turn causes the CPU to sample the printer status register by means of the OPER STAT signal. If any of these printer conditions is serious enough (by design definition) to warrant informing the host computer thereof, such status condition or conditions are formed into a status byte which is sent to the host computer in response to periodic status requests. This is accomplished by means of routines contained in the program which form no part of this invention.

After the RAM 13-2 has been loaded with a block of characters and the buffer ready condition is detected by the CPU, the program branches to routines which perform such operations as tests for offline, operator intervention, error calculations, status posting and the like. As none of these routines forms a part of this invention or is germane to an understanding of this invention, they will not be described in detail herein. Suffice it to say that if the results of these tests are such that the block of data is to be printed, a printer busy condition is posted and the printer controller enters a print routine.

In accordance with this invention, the print routine operates the CPU in a processing loop which includes a line examination mode followed by a print line mode for each character line until all character lines in the block have been processed. With reference now to the flow diagram of FIG. 3, the routine controlling the line examination mode is entered at point B. In the line examination mode the CPU is operable to examine each character in the line or character sequence until an EOL or EOB character is detected and upon such detection to exit to a routine controlling the print mode. At the outset, pointers used in addressing the RAM are initialized for addressing the next line to be examined as illustrated at box 300. The routine then enters a null test loop illustrated by boxes 301 and 302 which essentially fetches the next character and tests it for a null and if a null, ignores it and fetches the next character and so on until a non-null character is found. The routine then tests for an EOB character at 303. If the character is an EOB, the entire buffer has been examined and the routine exits to a POLL routine which posts a non-busy status and awaits the transmission of another block of characters from the host computer. The POLL routine does not form any part of this invention and its details are unnecessary for an understanding of this invention.

The routine then proceeds to a loop in which the characters are examined one by one until an EOL or an EOB character is detected. This series of tests begins at box 305 which tests for an end of line character. If the test is negative, the routine proceeds to box 306 which tests for an EOB character. If the character is not an EOB character, the routine loops back to box 304 and the next character is fetched. The series of tests then continues until one of the tests is positive.

If the EOL test at box 305 is positive, the routine proceeds to box 308 which requires a fetching of the next character which is in turn tested at box 311 for a line feed command. On the other hand, if the EOB test is positive, the routine proceeds to box 309 to set or post an EOB flag and then exits to the print line mode at point C.

If the line feed command character test (box 311) is negative, the routine proceeds immediately to exit to the print mode at point C. On the other hand, if the line feed character command test is positive, the routine proceeds to a loop which properly sets the line feed count. This loop is entered at box 312 which increments the line feed count. The next character is then fetched at box 313 and the loop proceeds to test this character for a carriage return or line feed. If it is neither, the routine proceeds to box 316. On the other hand if such next character is a carriage return, the next character in succession is examined and so on (by the loop consisting of boxes 313 and 314) until a non-carriage return character is found. If this character is a line feed command character, the program loops to the box 312 where the line feed count is again incremented. The carriage return and line feed tests are repeated until a non-carriage return and non-line feed character is found, at which time the routine proceeds to box 316.

At box 316 the routine acts to substitute for the line feed command a line advance order command. According to one design, the line advance order command includes an accompanying parameter character which signifies an integer between zero and 127. The command is interpreted by the printer to move the platen up the number of character lines specified by the value of the parameter. The routine then proceeds to point C for entry into the print line mode.

Figure 4:
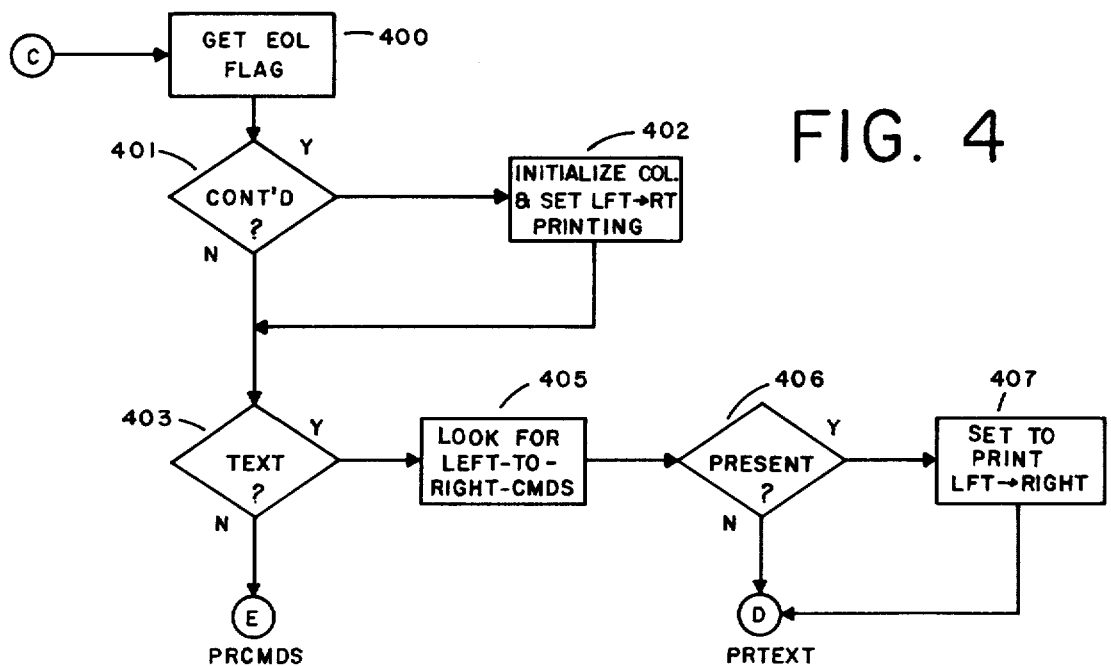

With reference to the flow diagram of FIG. 4, the routines which control the print line mode are entered at point C. At box 400, the EOL flag of the previous buffer is retrieved and is tested for continuation at box 401. If this flag signifies an EOB, the present buffer is continued from the previous buffer. Flags are set at box 402 so as to cause printing to be left-to-right and to continue from where it left off in the previous buffer. If the EOL flag signifies an EOL condition the present buffer is not continued and the routine proceeds to box 403.

Figure 5:
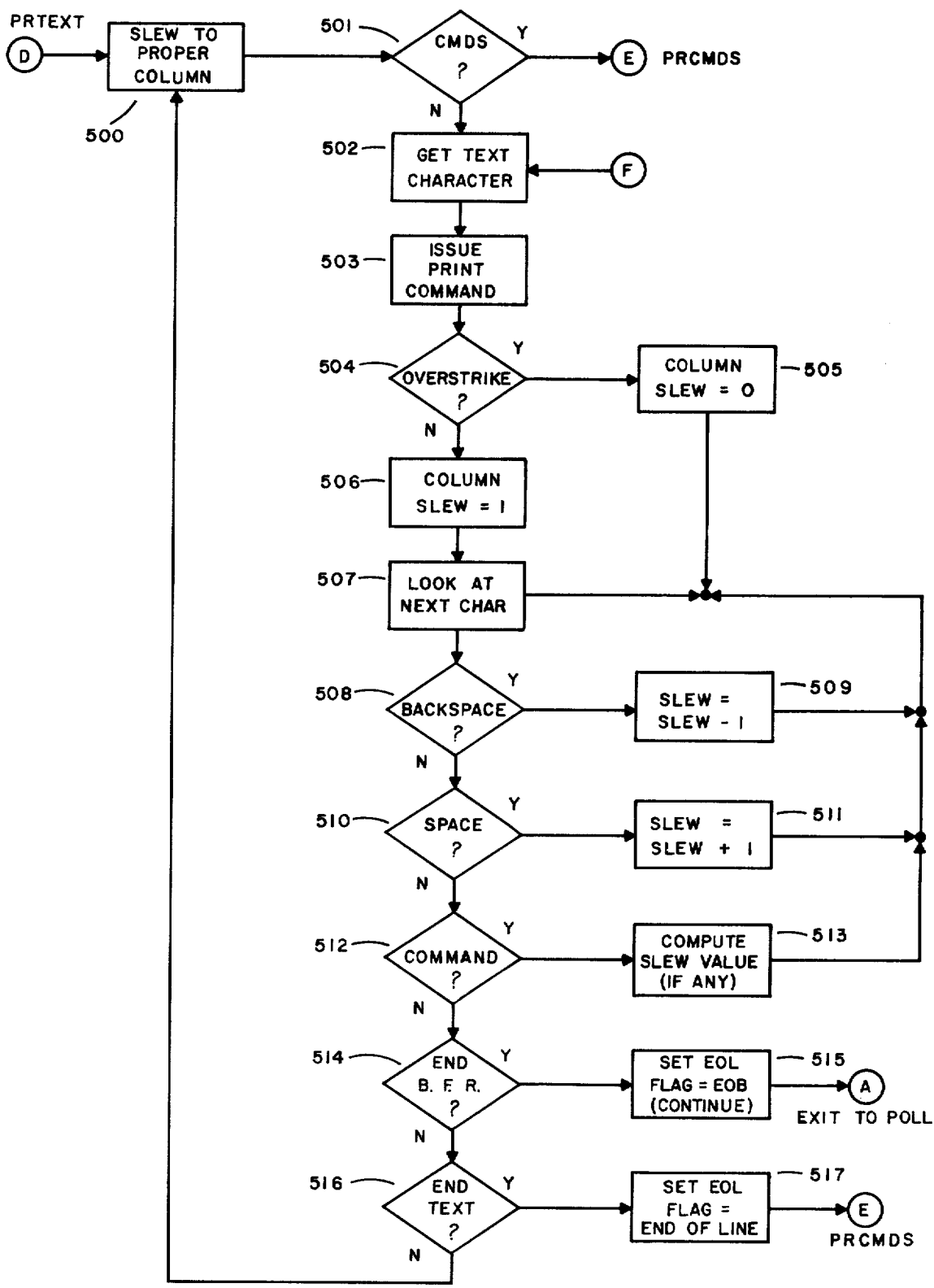

At box 403 it is determined whether the line of characters is text or commands. If commands, it proceeds to point E to a routine called print commands. If text, the routine proceeds to box 405 to search for left to right commands (for example, tab commands). If there are no such commands the routine proceeds (box 406) to point D to a print text routine. If there are left to right commands the routine proceeds to box 407. Box 407 sets a flag which will force left-to-right printing when the carrier is moved to the starting print position at box 500 (FIG. 5). Otherwise, the carrier will be moved left or right, whichever distance is shorter. In case of the carrier being moved to the right, printing will necessarily be in reverse sequence (right to left).

With reference now to the flow diagram of FIG. 5 the entry point for the print text routine is at point D. At box 500 the print text routine initially causes the CPU to provide a carriage move command to the printer via the printer interface to slew the carriage to the proper column at which printing of the line is to commence. The routine then proceeds at box 501 to determine whether the next character is a command. If a command, it exits to the PRCMDS (process commands) routine at point E. On the other hand, if the character is a textual character, the routine proceeds to box 502 to cause the CPU to transfer the text character to the printer data register 14-1 in the printer interface. The routine then proceeds at box 503 to cause the CPU to load a print command to the printer command register 14-2.

The printer responds to the printer command to print the textual character at this time. For example, the transfer of a textual character (box 502) and of a print command (box 503) involves:

(1) placing the first four bit slice of the textual character on data bus 18,
(2) fetching a bit pattern from the ROM and sending it to the decoder via the control bus 20 to produce the control signal LDDR1 to load the first four bit slice into the printer data register 14-1.
(3) placing the second four bit slice of the textual character on the data bus,
(4) fetching a bit pattern which produces the control signal LDDR2 to load the second four bit slice into register 14-1,
(5) placing the print command in data bus 18, and
(6) fetching a bit pattern which produces the control signals LDCMDR and CLRST for loading the print command into the printer command register 14-2 and clearing the command therefrom at the end of the strobe or sample window.

The routine is then free to continue its operating sequence except that it cannot again proceed to box 503 until the printer upon completion of its print operation posts a print wheel ready interrupt flag in the interrupt control 16. This results in an INT signal to the CPU which branches to the interrupt routine for sampling the interrupt register. Upon determination that the interrupt is the print wheel ready (i.e., ready to receive another print command), the CPU clears the interrupt flag and returns to the print mode return.

The routine now proceeds to a sequence of operations which, in accordance with a feature of this invention, examines the characters to test for an overstrike character. Examples of overstrike operations achievable are shown in FIG. 2. The Greek character phi can be formed by overstriking a "O" with a "/" which expands the character repetoire. Underlining is accomplished in the same manner, e.g., overstriking an "A" with a "—". These operations are achieved without the need for backspace, tab, carriage return or other horizontal escapement commands.

As mentioned previously these data transfers are under firmware control, that is, control by bit patterns which are stored in the program in the ROM. The routine begins the overstrike sequence at box 504 and proceeds to determine whether the character being printed is an overstrike character. If it is (tag bit set), the routine sets a column slew parameter equal to zero at box 505 and proceeds to box 507. On the other hand if the character is not an overstrike character (tag bit reset), the column slew is set equal to one at box 506 and the routine proceeds to box 507.

Box 507 is the entry point of a loop which serves to adjust the column slew which has just been set in accordance with any horizontal escapement required by the next ensuing character. At box 507 the next character is fetched and examined at boxes 508, 510 and 512 for backspace, space or command. If such character is a backspace, space or command, the slew is set equal to —1, +1 or to a computed slew value at boxes 509, 511 and 513, respectively, and the routine returns to box 507 to examine the next character in succession. This procedure continues until a character so fetched is neither a backspace, a space nor a command. When this happens, the routine proceeds to box 514 to determine whether the character is an EOB. If an EOB, the routine proceeds to box 515 and sets an EOL flag condition equal to the EOB condition and then exits to the POLL routine. On the other hand if the character is not an EOB, the routine proceeds to box 516 where it determines if the character is the end of textual characters in the line.

If so, the routine proceeds to box 517 to set the EOL flag equal to the end of line condition and exits at point E to the PRCMDS routine. On the other hand if the character is a textual character, the routine loops back to box 500 and continues the processing of the remaining textual characters in a line.

Figure 6:
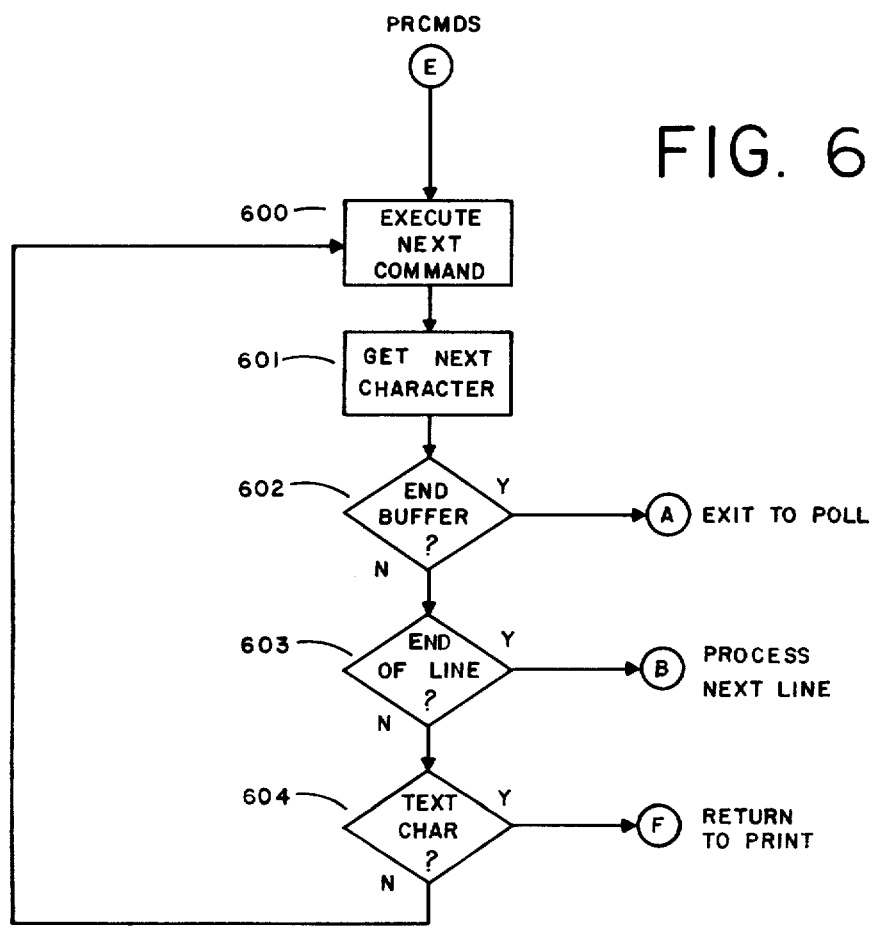

With reference now to the flow diagram of FIG. 6, the PRCMDS routine is entered at point E. At box 600, the imbedded command is executed. The next character is fetched at box 601 and at boxes 602, 603 and 604 for EOB (continuation), EOL (end of line), or text. If none of these are present, the character is another command, and the program loops back to box 600. Imbedded commands may consist of such things as tab, ribbon shift, and modifying the vertical and horizontal escapement dimensions.

Thus, while preferred embodiments of the invention are shown in the drawings, it is to be understood that this disclosure is for the purposes of illustration only and the various changes in the hardware and firmware as well as the substitution of equivalent elements for those herein shown and described may be made without departing from the spirit and scope of this invention as set forth in the appending claims.

What is claimed is:

1. A programmable controller for a printer comprising:

a memory means, a processor unit, a data source interface and a printer interface interconnected with one another;

input means including the data source interface for sequentially receiving a plurality of blocks of characters, at least one of such blocks including at least one complete line of textual characters followed by a first incomplete line of textual characters and the next succeeding block including a second incomplete line such that the first and second incomplete lines when linked together form a complete line;

control means including the processing unit and a program stored in the memory means for operating the processing unit for each such block in a processing loop which includes a line examination mode followed by a print line mode, the processing unit acting (i) during each line examination mode to examine each character in the line being examined and upon detection of either an end of line condition or an end of block condition to exit to the print line mode, (ii) during each print line mode to provide a set of control signals, the textual characters of the line just examined and an associated set of print commands to the printer interface, (iii) to post a flag signifying the incomplete status of said first incomplete line when processing said one block, and (iv) upon receipt of said next succeeding block to check such flag and to link the first and second incomplete lines by initializing horizontal and vertical escapement values for continuance of printing from the end of such first incomplete line; and output means including the printer interface responsive to control signals to provide to the printer the textual characters and any associated print commands.

2. The controller as claimed in claim 1
   wherein the end of line condition is an end of line character which delimits a complete line; and
   wherein the end of block condition is an end of block character.

3. A programmable controller for an impact printer comprising:

a memory means, a processor unit and a printer interface interconnected with one another;

input means including the processor unit for receiving a block of characters and storing such block in the memory means, the block of characters including a sequence of textual characters, each character including a field of bit positions defining character intelligence and an additional bit position which, if reset, signifies a normal character and if set, signifies an overstrike operation in which the next ensuing character is to be overstriken upon the character with such bit set;

control means including a program stored in the memory means for operating the processing unit in a print line mode to provide a set of control signals, the textual characters of the sequence and a set of associated print character commands to the printer interface, the print mode having an operating loop in which the processing unit generates for each textual character a print command specifying an escapement of zero for an overstrike textual character and of one unit for a normal textual character; and output means including the printer interface responsive to the set of control signals to provide to the printer the textual characters and the associated set of print commands such that the printer prints in the same character position on a print media an overstrike textual character and the immediately following textual character without any intervening horizontal escapement operation.

4. The controller as claimed in claims 3 or 2 wherein the program includes a number of bit patterns which are fetched by the processor unit from the memory means and which are used by the control means to generate said control signals.

5. The controller as claimed in claim 4 wherein the control means further includes a decoder circuit responsive to said bit patterns to generate said control signals.

* * * * *